No. 617,802. Patented Jan. 17, 1899.
A. C. BROWNELL.
ROLLER BEARING FOR CARRIAGE WHEELS.
(Application filed June 10, 1898.)

(No Model.)

WITNESSES.
Charles T. Hannigan.
A. E. Perce.

INVENTOR.
Alexander C. Brownell
Warren R. Perce
Atty.

UNITED STATES PATENT OFFICE.

ALEXANDER C. BROWNELL, OF PROVIDENCE, RHODE ISLAND, ASSIGNOR OF ONE-HALF TO HENRY T. McDONALD, OF SAME PLACE.

ROLLER-BEARING FOR CARRIAGE-WHEELS.

SPECIFICATION forming part of Letters Patent No. 617,802, dated January 17, 1899.

Application filed June 10, 1898. Serial No. 683,124. (No model.)

*To all whom it may concern:*

Be it known that I, ALEXANDER C. BROWNELL, a citizen of the United States, residing at Providence, in the county of Providence and State of Rhode Island, have invented certain new and useful Improvements in Roller-Bearings for Carriage-Wheels, of which the following is a specification, reference being had therein to the accompanying drawings.

Like letters indicate like parts.

Figure 1:
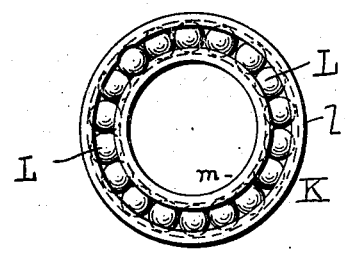
Figure 2:
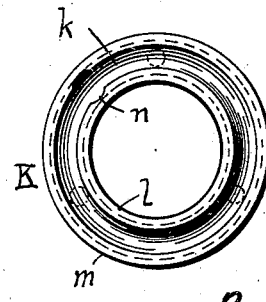
Figure 3:
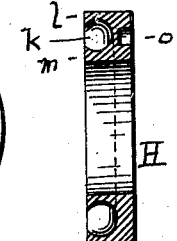
Figure 4:
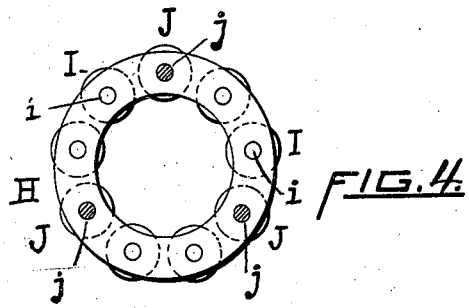
Figure 5:
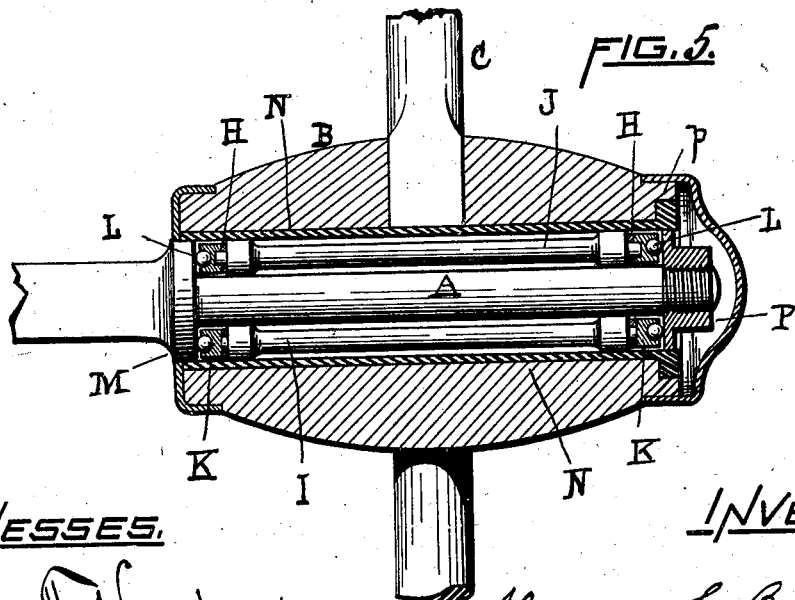

Figure 1 is an end elevation of one of the ball-bearing rings of my device, showing the balls mounted in the annular channel thereof. Fig. 2 is an elevation of the exterior side of said ball-bearing ring and illustrates the annular channel of the same and how the balls may be inserted in the channel. Fig. 3 is a view of said ring as seen partly in elevation and partly in section on the diameter thereof. Fig. 4 is a side elevation of the cage and illustrates the manner in which the rollers are mounted. Fig. 5 is a central longitudinal section of the hub of a carriage-wheel provided with my improved roller-bearing.

My invention relates to roller and ball bearings for the hubs of carriage-wheels; and it consists of the combination, with a carriage-wheel hub and the axle on which said hub is mounted, of a cage provided with rollers which are in rolling contact with the axle, and also with balls and a supporting-ring therefor on the sides of the cage adapted to resist the end-thrust friction of the wheel-hub against suitable bearing-surfaces, which balls are loosely mounted and held in an annular channel of each ring, said cage, with its rollers and balls, being placed in a tubular box which extends longitudinally through the hub, all as hereinafter more particularly described.

In the drawings, A is the axle of a carriage or wagon screw-threaded at its outer end, as usual. B is the hub of the wheel, having the usual spokes C. The ends of the hub B have caps, as shown in Fig. 5. In the bore of the hub, which is straight and uniform throughout, a tube or box N is inserted. A nut P, having a flange *p*, engages with the screw-threaded end of the axle A.

A cage H is provided for the hub B, and consists of two rings for rollers, mounted rotatably between them. Some rollers (indicated as I) have their journals *i* integral therewith, while others of the rollers, preferably three in number, (indicated as J,) have each a central tubular bore through which a journal or pin loosely passes, so that said roller J may rotate thereon. The journals *i* of the roller I extend through the rings of the cage H, so that their ends lie flush with the outer surface of the rings, respectively, as seen in Figs. 4 and 5. The journals or pins of the rollers J, however, project slightly beyond the outer surfaces of the rings of the cage H, as illustrated in said figures. The rollers I J are so mounted that their peripheries extend slightly beyond the inner circumference of the rings of the cage H, as shown.

On each end of the cage H is a ball-supporting ring K. These rings have an annular channel *k* on their outer surfaces between two annular lips or flanges *l m*. The lips *l m* are notched or slightly cut away, as at *n*. The ring K has three or more sockets *o*, corresponding in number, size, and position with the pins or journals of the rollers J.

Balls L are mounted loosely in the channels *k* of the rings K, respectively. Each ball is inserted in the enlarged space provided by the notches *n*, and the lips *l m* confine the balls L within the channel *k*, as shown in Fig. 1.

The cage H and rings K are assembled as shown in Fig. 5, the journals of the rollers J extending into and fitting snugly the sockets *o* of said rings. The balls L of the inner series have their external bearing within the box N of the hub against the flange or fixed collar M of the axle A, as seen in Fig. 5, and the balls of the outer series have their external bearing against the back of the flange *p* of the nut P.

The rollers I and J are in contact with the tube or box N, as shown in Fig. 5, and give a vertical roller-bearing upon the axle A, while the balls L furnish a lateral or endwise bearing against the flange M and the inner surface of the flange of the nut P. The balls L are useful to receive the end-thrust friction when the wheel is traveling on a curve, and the rollers I J furnish the bearing when the wheel is traveling in a straight direction or course.

The caps on the outer and inner ends of the hub B serve to exclude the dust from the axle, box, rollers, and bearings.

The projection of the journals of the rollers J beyond the outer surface of the rings K makes them useful as a fastening means to hold said rings to the cage H, which is accomplished by the snug engagement of said journals in the sockets o of the rings K, as seen in Fig. 5.

I claim as a novel and useful invention and desire to secure by Letters Patent—

In combination with a wheel-hub, centrally and longitudinally bored, a tube inserted in said bore, an axle screw-threaded at its outer end and having, at a distance from the outer end nearly equal to the length of the hub, a flange extending circumferentially therefrom, a nut engageable with the end of the axle and provided with a flange, rollers mounted in rings and adapted to furnish bearings between the hub and axle, ball-bearing rings placed externally of the rings first named and provided each with an annular channel, and balls mounted loosely in said channels and having bearings against said flanges, respectively, substantially as described.

In testimony whereof I affix my signature in presence of two witnesses.

ALEXANDER C. BROWNELL.

Witnesses:
DANIEL W. FINK,
WARREN R. PERCE.